(12) United States Patent
Saito et al.

(10) Patent No.: US 6,749,378 B2
(45) Date of Patent: Jun. 15, 2004

(54) SEMI-CONTACT GUIDE APPARATUS AND MACHINE TOOL USING THE GUIDE APPARATUS

(75) Inventors: Toshiyuki Saito, Kariya (JP); Tetsuo Teramura, Kariya (JP); Toshiharu Takashima, Kariya (JP); Michihiro Suzuki, Kariya (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/067,367

(22) Filed: Feb. 7, 2002

(65) Prior Publication Data

US 2002/0176757 A1 Nov. 28, 2002

(30) Foreign Application Priority Data

Feb. 7, 2001 (JP) ........................................ 2001-031463

(51) Int. Cl.⁷ ................................................. B23C 1/00
(52) U.S. Cl. ........................ 409/235; 409/135; 409/137; 409/190; 409/191
(58) Field of Search ................................ 409/135, 137, 409/235, 190, 191; 384/12, 13

(56) References Cited

U.S. PATENT DOCUMENTS

| | | | |
|---|---|---|---|
| 2,520,879 A | | 8/1950 | Dall |
| 2,869,933 A | | 1/1959 | Bissinger |
| 3,603,652 A | * | 9/1971 | Youden ...................... 409/904 |
| 3,781,069 A | * | 12/1973 | Gluchowicz ................. 384/12 |
| 3,903,993 A | | 9/1975 | Vorrhees et al. |
| 4,252,381 A | * | 2/1981 | Kimmelaar ................... 384/13 |
| 4,351,574 A | * | 9/1982 | Furukawa et al. ............. 384/8 |
| 5,104,237 A | * | 4/1992 | Slocum ................... 29/898.02 |
| 5,694,811 A | * | 12/1997 | Tsukada ...................... 384/13 |
| 6,110,010 A | | 8/2000 | Pflager et al. |

* cited by examiner

*Primary Examiner*—A. L. Wellington
*Assistant Examiner*—Dana Ross
(74) *Attorney, Agent, or Firm*—Oblon, Spivak, McClelland, Maier & Neustadt, P.C.

(57) ABSTRACT

A semi-contact guide apparatus includes a bed as a first member, a column as a second member, a plural number of oil-hold portions and an oil-supply device. The column is movably guided on the bed. A sliding surface is formed on the column. The plural number of oil-hold portions is formed on the sliding surface. Dimensions of the oil-hold portions are defined according to load distribution of the weight of the column. The oil-supply device supplies lubricant oil to the oil-hold portions. The amount of lubricant oil supplied to the oil-hold portion is defined according to each of dimensions of the oil-hold portions. Since the dimensions such as areas of the oil-hold portions and the amount of the lubricant oil supplied to the oil-hold portion are defined as above, inclination of the column on the bed is prevented, and the column can be smoothly moved on the bed.

10 Claims, 7 Drawing Sheets

SEMI-CONTACT GUIDE APPARATUS AND MACHINE TOOL USING THE GUIDE APPARATUS

The present application claims priority under 35 U.S.C. §119 to Japanese Patent Application No. 2001-31463, filed on Feb. 7, 2001. The contents of that application are incorporated herein by reference in their entirety.

BACKGROUND OF THE INVENTION

1. Field of the Invention

This invention relates to a guide apparatus and a machine tool using the guide apparatus, which guides a movable member such as a column of the machine tool in a state of semi-contact.

2. Discussion of the Background

A machine tool has a bed, and a column that is moved on the bed, as main constituent elements. For instance, a workpiece is attached on the bed, and a machining means (a cutting tool) and a drive means (a tool drive motor) that drives the machining means are attached on the column. As a way to movably guide the column on the bed, it is known to supply pressurized lubricant oil between sliding surfaces of the bed and column, to keep a transition state which is intermediate between a state in which the column does not contact the bed (floats) and a state in which the column contacts the bed (does not float), so as to reduce weight of the column acting on the bed. In other words, a machine tool in which the column is moved under a state of semi-contact (semi-float) is known.

Figure 1:
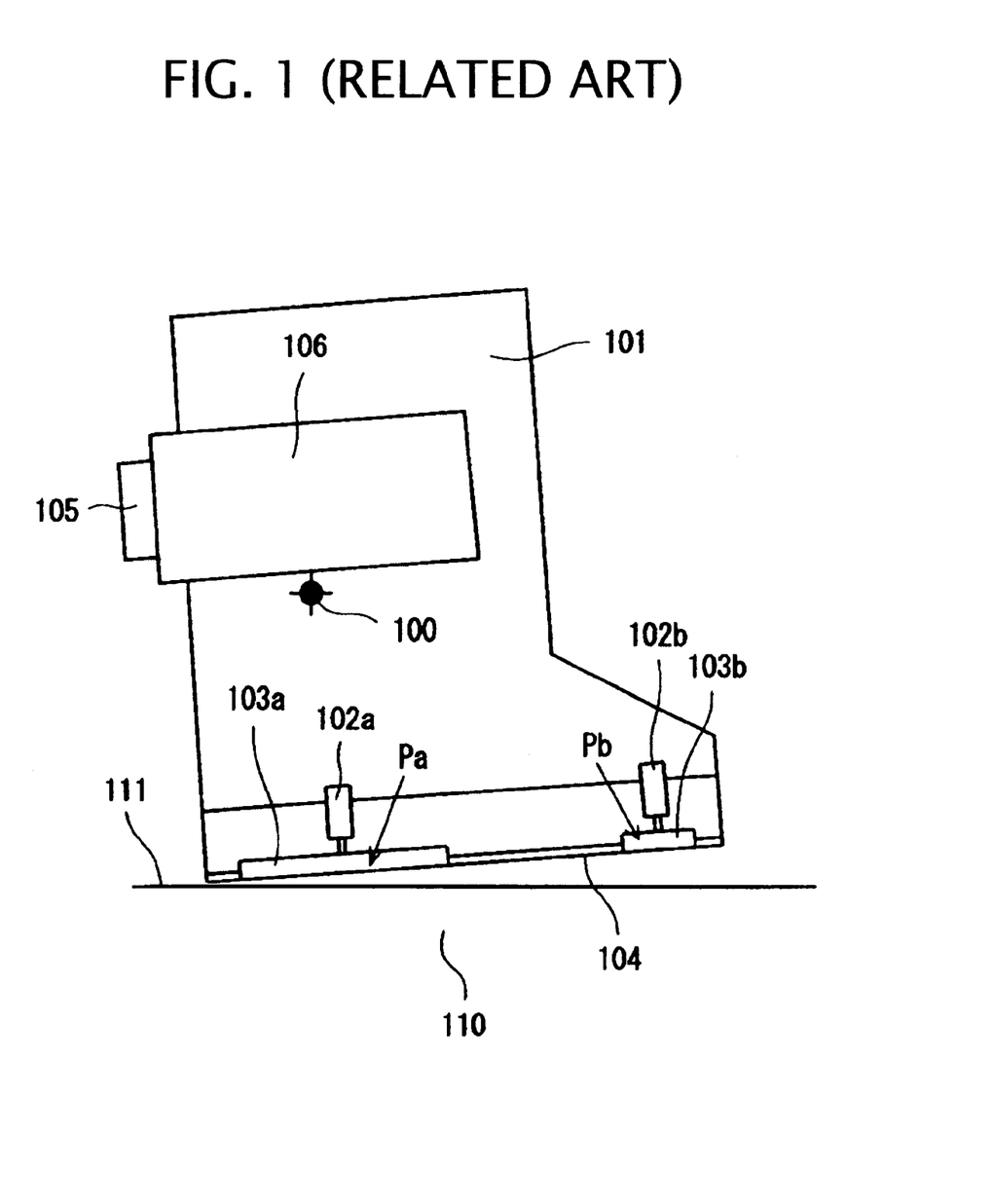
FIG. 1 is a side-view of a conventional machine tool.

FIG. 1 is a side-view of a conventional machine tool. Referring to FIG. 1, a column 101 is moved (right and left directions in FIG. 1) along a sliding surface 111 of a bed 110. Lubricant oil is supplied between the sliding surface 111 of the bed 110 and a sliding surface 104 of the column 101. It is designed such that a product of an area of oil-hold portions (to be described later) which the pressure of the lubricant oil acts on, and the pressure of the lubricant oil, is equal to the weight of the column 101. Therefore, the column 101 can be guided on the bed 110 in a state of semi-contact (semi-float) by the lubricant oil. The column 101 is moved on the bed 110 in a state of semi-contact (semi-float) by a well known means such as a motor.

A tool spindle 105 supporting a tool, a tool drive means 106 to drive the tool spindle 105 and other elements are attached to the column 101. Accordingly, the center of gravity of the whole column 101 is unbalanced in a moving direction in most cases. Since such a load unbalanced column 101 inclines on the bed 110, the column 101 cannot be moved smoothly on the bed 110.

Therefore, a plural number of the oil-hold portions (for example, quadrangular grooves) to hold the lubricant oil are formed on the sliding surface 104 of the column 101, and an area of each oil-hold portion is designed according to a load which is acting on the oil-hold portion. For instance, two oil-hold portions 103a, 103b are formed on the sliding surface 104 of the column 101 along the moving direction of the column 104. The lubricant oil is supplied to the oil-hold portions 103a, 103b via throttle nozzles 102a, 102b. Areas of the oil-hold portions are designed according to the load of the column 101 acting at the location of each oil-hold portion 103a, 103b. That is, since the center of gravity 100 of the column 101 is located forward (left direction in FIG. 1) because of the locations of the tool spindle 105 and the tool drive means 106, the area of the oil-hold portion 103a onto which a heavier load acts is larger than the area of the oil-hold portion 103b onto which a lighter load acts. On the other hand, the throttle nozzles 102a, 102b are designed to have the same opening as each other and are connected to a single oil-supply device.

In the aforementioned machine tool, the same amount of lubricant oil, per unit time, is supplied to the oil-hold portions 103a, 103b whose areas are different from each other. When the stationary column 101 is moved, the column 101 is floated by an wedge effect of the lubricant oil, and a clearance between the sliding surface 104 of the column 101 and the sliding surface 111 of the bed 110 becomes wider. The wedge effect acting on the column 101 is remarkable in the state of the semi-contact (semi-float). The lubricant oil is supplied into the clearance from the throttle nozzles 102a, 102b. Since the openings of the throttle nozzles 102a, 102b are the same, supplying the lubricant oil to the oil-hold portion 103a whose area is larger than the area of the oil-hold portion 103b is delayed relative to supplying the lubricant oil to the oil-hold portion 103b. As the result, the pressure Pa of the lubricant oil in the oil-hold portion 103a becomes smaller than the pressure Pb of the lubricant oil in the oil-hold portion 103b. Therefore, the column 101 inclines further on the bed 110 and cannot be smoothly moved on the bed 110.

SUMMARY OF THE INVENTION

In view of the foregoing, it is an object of the present invention to provide an improved semi-contact guide apparatus and a machine tool using the guide apparatus. In order to achieve the above and other objects, the present invention provides a semi-contact guide apparatus comprising a first member, a second member, a plural number of oil-hold portions and an oil-supply device. The second member is movably guided on the first member. A sliding surface is formed on the second member. The plural number of oil-hold portions is formed on the sliding surface. Dimensions of the oil-hold portions are defined according to the load distribution of the weight of the second member. The oil-supply device supplies lubricant oil to the oil-hold portions. The amount of the lubricant oil supplied to the oil-hold portion is defined according to the respective dimensions of the oil-hold portions. Since the dimensions of the respective oil-hold portions are defined according to the load distribution of the weight of the second member, and the amount of the lubricant oil supplied to the oil-hold portions is defined according to the dimensions of the respective oil-hold portions, the second member is prevented from inclining on the first member, and the second member can be smoothly moved on the first member.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Embodiments of the present invention will be described with reference to the drawings. Computerized numerically controlled (CNC) machine tools that have three control axes of X, Y and Z are described as the embodiments of the present invention.
First Embodiment Directions of the three axes of X, Y and Z are defined according to arrows shown in FIG. 2. Especially for the Z-axis, an arrow Z1 defines forward.

Figure 2:
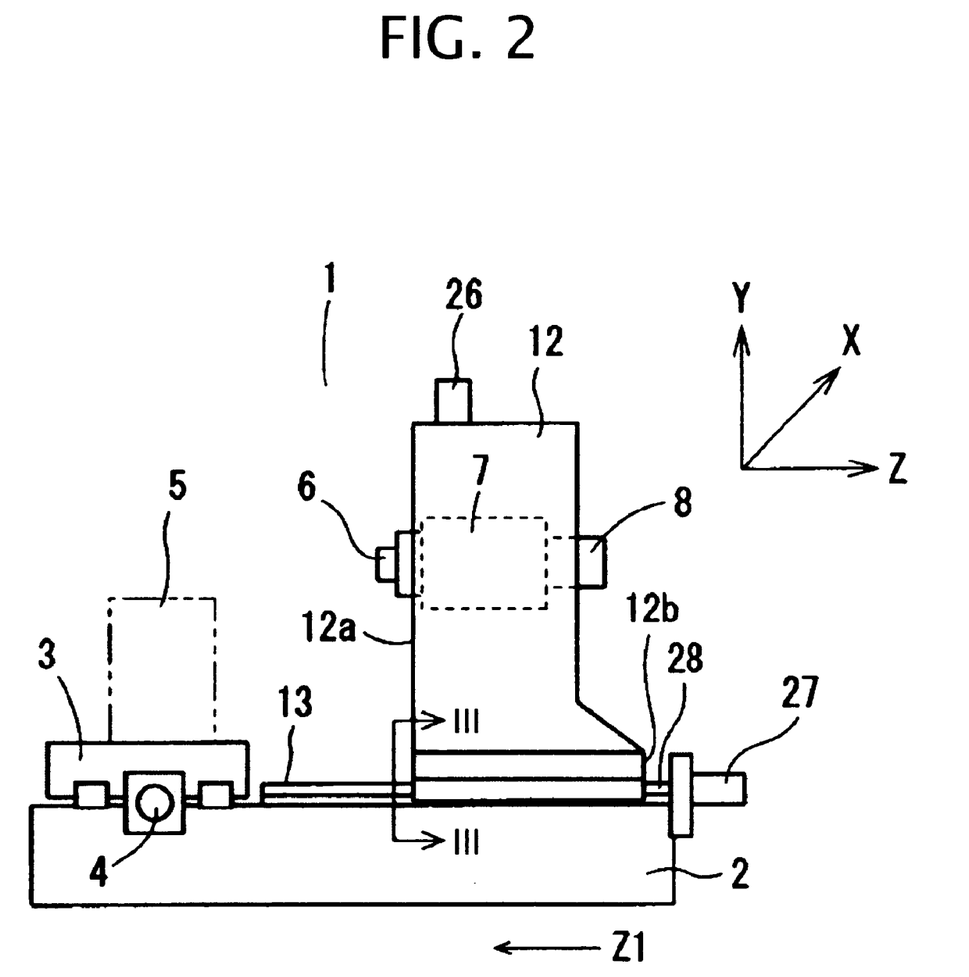
FIG. 2 is a side-view of a machine tool according to a first embodiment of the present invention.
Figure 3:
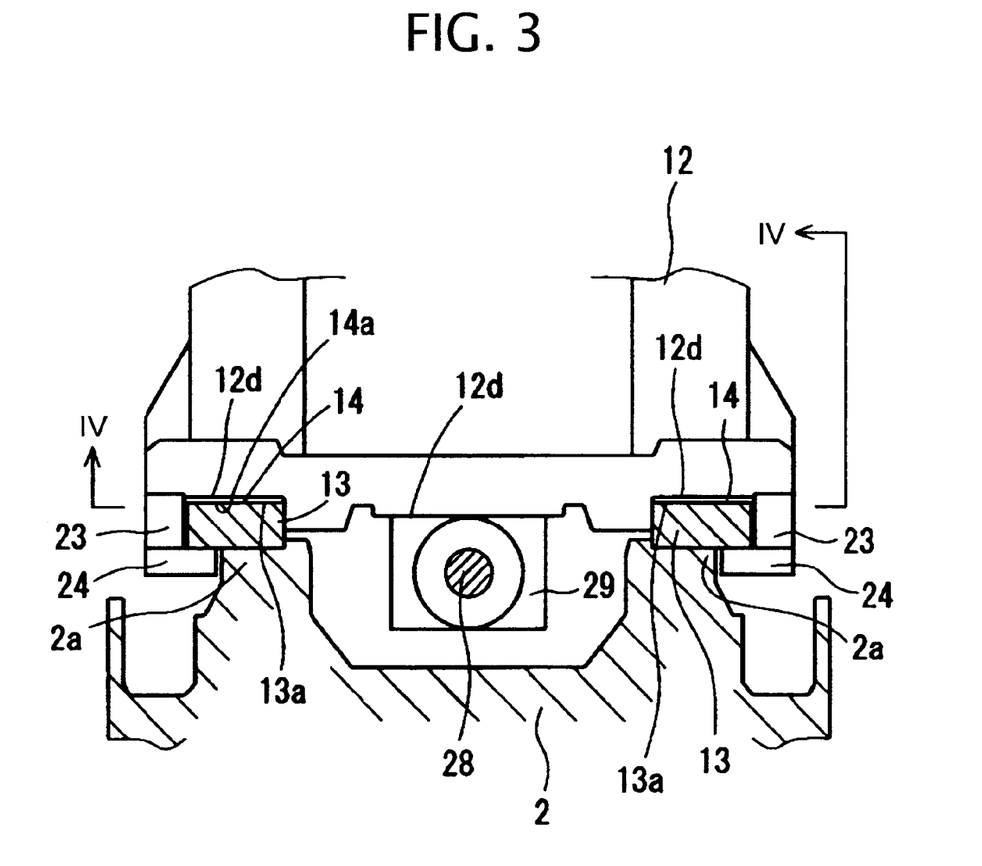
FIG. 3 is a cross-sectional view taken along line III—III in FIG. 2.

As shown in FIG. 2, the machine tool 1 has a table 3 to which a workpiece 5 is attached, a column 12 to which a tool spindle 6 is mounted, a bed 2 supporting the table 3 and the column 12, and a computerized numerical controller (not shown) controlling the machine tool 1. The table 3 is moved on the bed 2 by an X-axis servomotor 4 along the X-axis. The column 12 is moved on the bed 2 by a Z-axis servomotor 27 along the Z-axis. The tool spindle 6 is supported by a spindle head 7 that comprises a spindle motor 8 for driving the tool spindle 6. The spindle head 7 is moved on the column 12 by a Y-axis servomotor 26 along the Y-axis.

Figure 5:
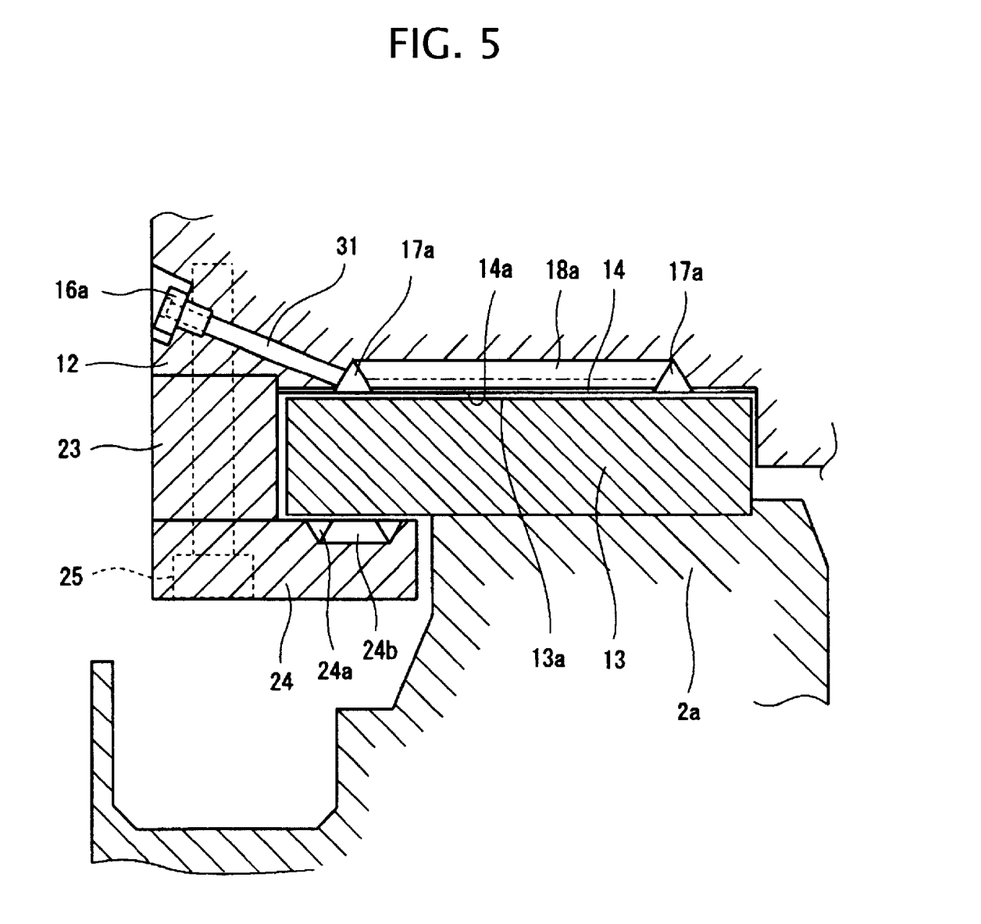
FIG. 5 is a cross-sectional view taken along line V—V in FIG. 4.

The bed 2 is, for example, a monocoque casting. Two guide plate attaching portions 2a are formed on the bed 2 along the Z-axis. Two guide plates 13 are fixed, for example by bolts (not shown), on the guide plate attached portions 2a of the bed 2. As shown by FIG. 5, the column 12 is arranged on sliding surfaces 13a of the guide plates 13 so that the column 12 sandwiches the guide plates 13 in cooperation with spacers 23 and back plates 24 which are fixed to the column 12 by bolts 25. Sliding material 14 such as "Turcite B" (a product of Captain Industries, Inc.) or "Bearee FL3305, FL3307" (products of NTN Engineering Plastics Corporation), that are PTFE (polytetrafluoroethylene) composite materials, is stuck on surfaces 12d opposed to the sliding surfaces 13a of the guide plates 13. The column 12 can slide on the guide plates 13 with the sliding surfaces 14a of the sliding material 14 contacting the sliding surfaces 13a of the guide plates 13. A Z-axis ball nut 29 is fixed on an under surface 12d of the column 12 between the two guide plate attaching portions 2a. The column 12 is driven by engaging the Z-axis ball-nut 29 with the ball screw 28 that is rotated by the Z-axis servomotor 27. Since the guiding and driving mechanisms of the table 3 on the bed 2 and the spindle head 7 on the column 12 are similar to the aforementioned mechanism of column 12 on the bed 2, explanations for these mechanisms are omitted.

Lubricant oil is supplied between the sliding surfaces 13a of the guide plates 13 and sliding surfaces 14a of the sliding material 14 to support the column 12 on the bed 2 in a state of a semi-contact (semi-float). Oil-hold portions 15a, 15b as bearing pockets are formed on the sliding surfaces 14a of the sliding material 14 to keep the lubricant oil therein so as to smoothly supply the lubricant oil between the sliding surfaces 13a and sliding surfaces 14a.

Figure 4:
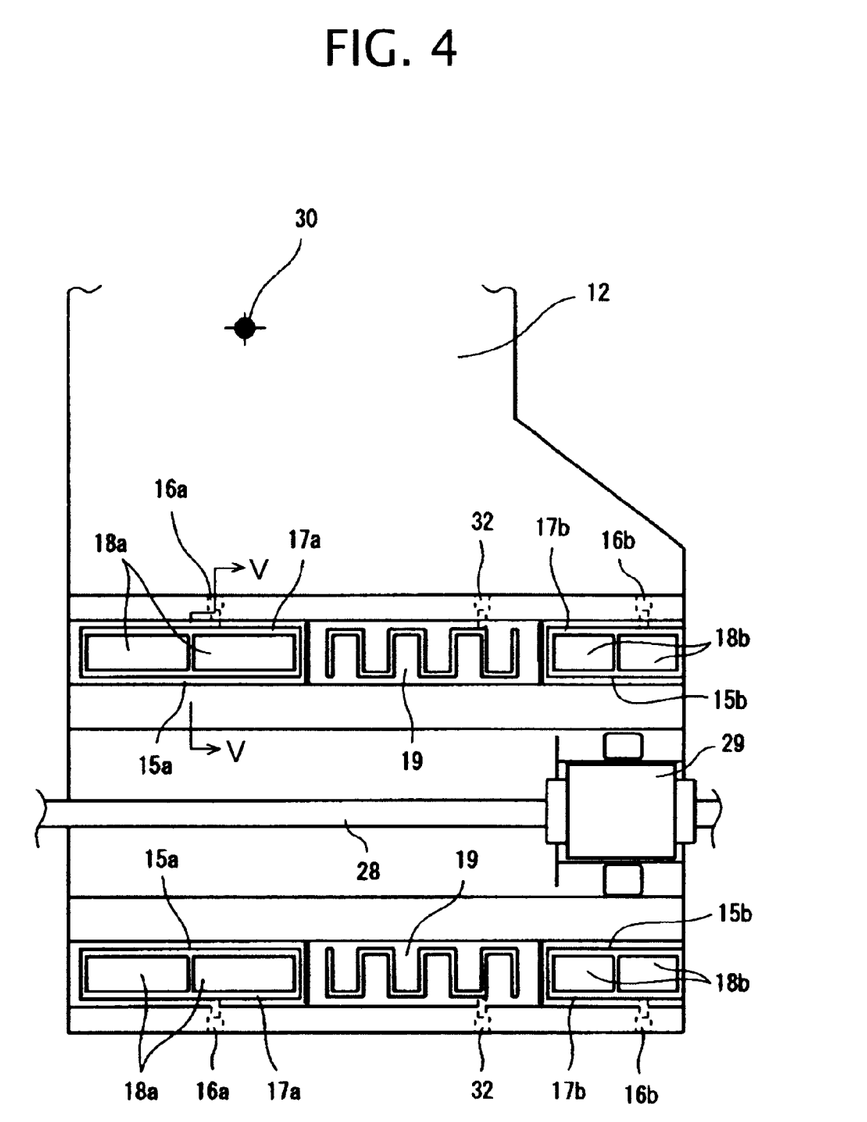
FIG. 4 is a cross-sectional view taken along line IV—IV in FIG. 3.
Figure 6:
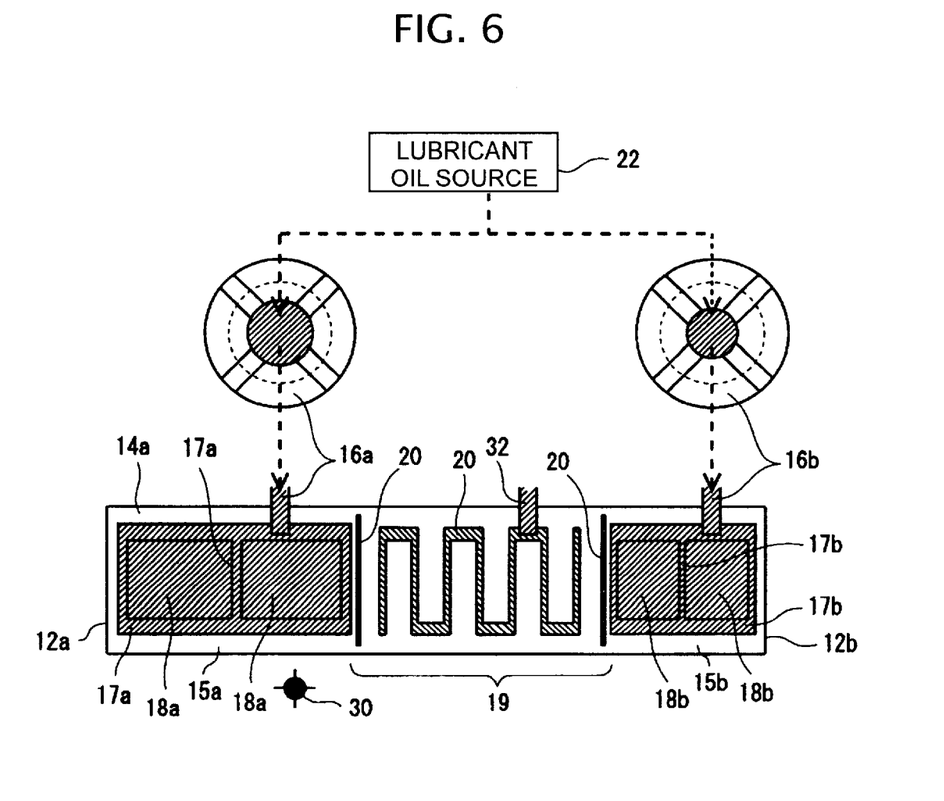
FIG. 6 is a cross-sectional view to show a construction of oil-hold portions and an oil-supply circuit of the first embodiment.

As shown by FIG. 4 and FIG. 6, the center of gravity 30 of the whole column 12 is nearer a front portion thereof because the spindle 7 and the spindle motor 8 are attached on the front portion of the column 12. In other words, the load distribution of the column 12 is such that it is heavier at the front portion of the column 12 and lighter at the rear portion of the column 12. Since the load of the column 12 is unbalanced in the Z-axis direction, a torque is produced around an axis that goes through the center of gravity 30 and is parallel to the X-axis. This torque causes the column 12 to incline on the bed 2.

Therefore, it is necessary that areas of the oil-hold portions 15a, 15b which are formed on four corners of the undersurface of the column 12 (in other words, that are at a front end and rear end of each sliding surface 14a) are designed according to the load distribution of the column 12 so as to prevent inclination of the column 12. As shown by FIG. 4 and FIG. 5, each oil-hold portion 15a includes two land portions 18a and an oil groove 17a that is formed around the land portions 18a. The plan view of each land portion 18a is a quadrangle, and the sectional view of the oil groove 17a is V-shape. Though a height of each land portion 18a is the same as a height of the sliding surface 14a, both the oil groove 17a and the land portions 18a can hold the lubricant oil. Besides, it is possible that each land portion 18a is formed so that the height of the respective land portion is lower than the height of the sliding surface 14a, as shown by a two-dot chain line in FIG. 5. Similarly, each oil-hold portion 15b includes two quadrangular land portions 18b and a V-shape oil groove 17b. As shown by FIG. 4, FIG. 5 and FIG. 6, the oil-hold portions 15a are formed near the front end 12a of the sliding surface 14a, and the oil-hold portions 15b are formed near the rear end 12b of the sliding surface 14a. Each of the oil-hold portions 15a, 15b is defined so that the area of the oil-hold portion 15a (for example, sum of surface areas of the land portion 18a and the oil groove 17a) is larger than the area of the oil-hold portion 15b, according to the load distribution of the column 12. Further, oil-hold portions including quadrangular land portions and a V-shape groove are similarly formed on each upper surface of the back plates 24.

An intermittent lubricant portion 19 is formed on the sliding surface 14a between the oil-hold portions 15a, 15b. The intermittent lubricant portion 19 is, for example, single continuous oil groove 20 whose sectional view is V-shape, and is formed as a crank-shape to extend widely over a center portion of the sliding surface 14a.

An oil-supply circuit for supplying lubricant oil between the sliding surfaces 13a, 14a is provided. The oil-supply circuit is a circulation circuit in which lubricant oil supplied between sliding surfaces 13a, 14a is collected, filtered and returned to a lubricant oil source 22. As shown by FIG. 6, the oil-supply circuit includes the lubricant oil source 22, such as a pump unit, and throttle nozzles 16a, 16b. The throttle nozzles 16a, 16b are screwed into holes 31 opened on the column 12, as shown by FIG. 5. The throttle nozzles 16a, 16b are connected with the oil grooves 17a, 17b via the holes 31. The lubricant oil is supplied to the oil-hold portion 15a through the throttle nozzle 16a, to the oil-hold portion 15b through the throttle nozzle 16b, and to the intermittent lubricant portion 19 through the throttle nozzle 32. However, the intermittent lubricant portion 19 also has an intermittent supply device (not shown) and another lubricant oil source (not shown) so as to supply lubricant oil at predetermined intervals of time. The pressure of the lubricant oil supplied to the oil-hold portions 15a, 15b is defined so that the product of the pressure and the total area of the oil-hold portions 15a, 15b is equal with the weight of the whole column 12 or slightly smaller. Further, openings of the throttle nozzles 16a, 16b are defined according to dimensions of the oil-hold portions 15a, 15b, as shown by areas of slanted lines portion of the throttle nozzles in FIG. 6. That is, the opening of the throttle nozzle 16a that is connected to the large oil-hold portion 15a is defined to be larger than the opening of the throttle nozzle 16b that is connected to the small oil-hold portion 15b. It is preferable that the ratio between the area of the oil-hold portion 15a and an opening area of the throttle nozzle 16a is approximately equal to the ratio between the area of the oil-hold portion 15b and an opening area of the throttle nozzle 16b. Correctly, it is preferable that the ratio between the volume of the oil-hold portion 15a and an opening area of the throttle nozzle 16a is approximately equal to the ratio between the volume of the oil-hold portion 15b and an opening area of the throttle nozzle 16b in a case that depths of the grooves of the oil-hold portions 15a, 15b are different.

In the aforementioned machine tool, when the lubricant oil is supplied from the lubricant oil source 22 to the oil-hold portion 15a, 15b via the throttle nozzle 16a, 16b, the column 12 assumes a state of semi-contact (semi-float), which is a transition state between a state in which the column 12 does not contact the bed 2 (floats) and a state in which the column 12 contacts the bed 2 (does not float). When the Z-axis servomotor 27 is driven according to the instruction from the computerized numerical controller, rotation of the Z-axis servomotor 27 is transmitted to the column 12 by the Z-axis ball screw 28 and the Z-axis ball nut 29, and the column 12 is moved along the Z-axis guide plates 13. Then, since the weight of the column 12 is reduced by the pressure of lubricant oil of the oil-hold portion 15a, 15b, the column 12 can be moved smoothly by small power. Further, since the areas of the oil-hold portions 15a, 15b are designed according to the load distribution of the column 12 and the openings of the throttle nozzle 16a, 16b are defined according to the areas of the oil-hold portions 15a, 15b, inclination of the column 12 is prevented.

Effects of the first embodiment of the present invention will be described with reference to FIG. 7.

Figure 7:
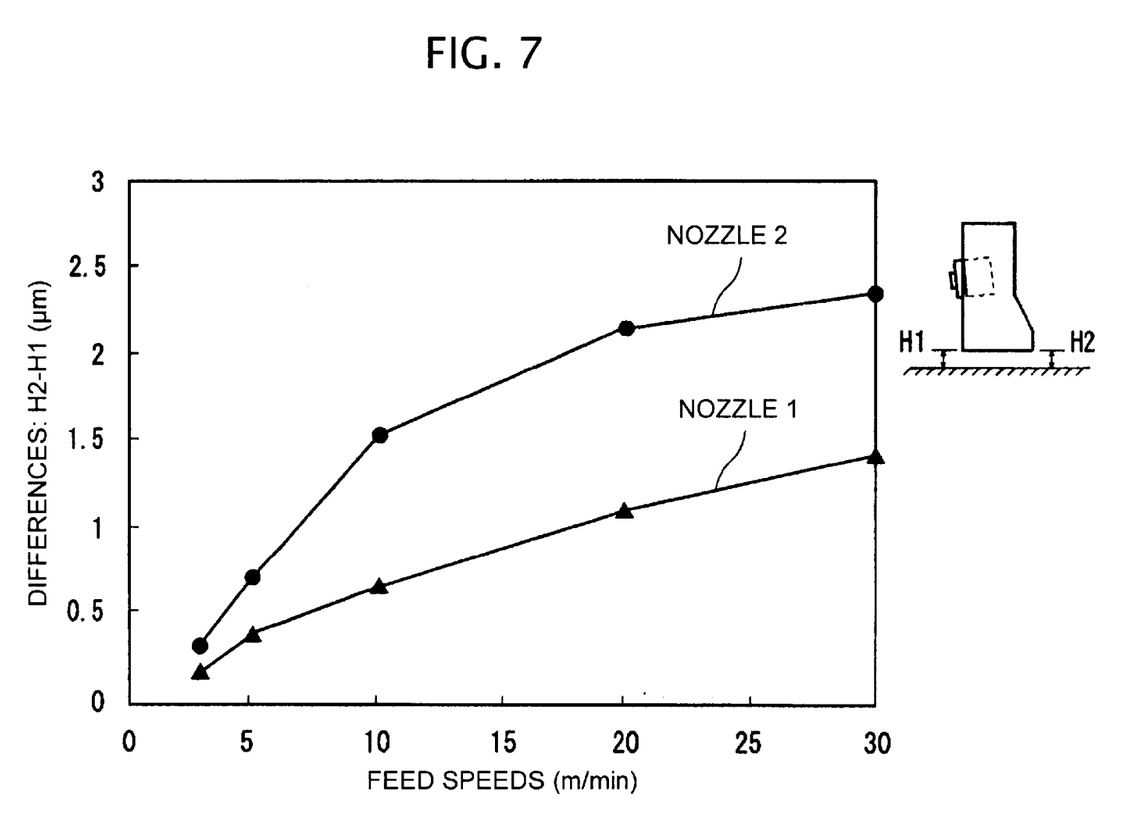
FIG. 7 is a graph to show relations between feed speeds of the column 12 and floating amount of the column 12.

FIG. 7 is a graph showing relations between feed speeds of the column 12 and the floating amount of the column 12, when the column 12 is moved along the Z-axis by the Z-axis servomotor 27. A vertical axis of the graph indicates differences H2-H1 between floating amount H1 of the front end of the column 12 and floating amount H2 of the rear end of the column 12. Areas of the oil-hold portions 15a, 15b are 500 cm$^2$ and 220 cm$^2$ respectively, which are designed according to the load distribution of the weight of the column 12 in this experiment. Diameters of the throttle nozzles 16a, 16b according to the invention (curve 1) are 0.6 mm and 0.4 mm respectively, which are selected according to the areas of the oil-hold portions 15a, 16b. On the other hand, diameters of throttle nozzles 16a, 16b of a comparative example (curve 2) are both 0.6 mm. As shown by the graph, differences of floating amounts H2-H1 are reduced to approximately half according to the invention, regardless of feed speeds. This means that inclination of the column 12 on the sliding surfaces 13a or the bed 2 is reduced. Therefore, machining precision of the machine tool is improved.

Second Embodiment

Figure 8:
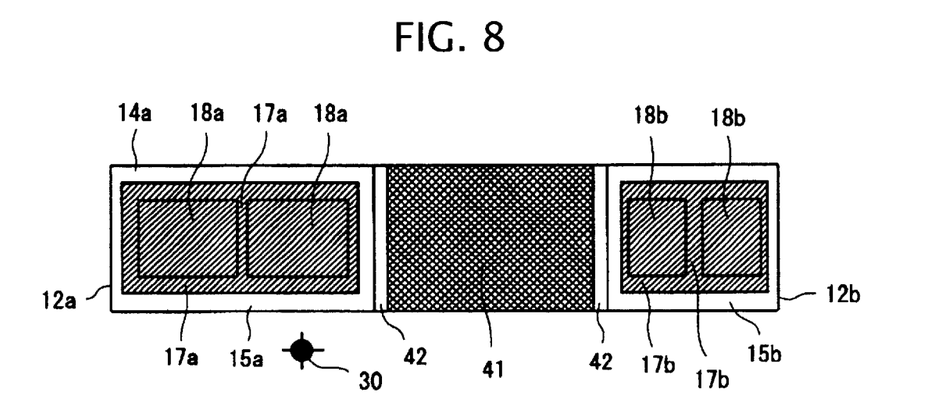
FIG. 8 is a bottom view to show a sliding surface of the column according to a second embodiment of the present invention.

FIG. 8 shows a sliding surface 14a of a sliding material. In the second embodiment, scraped surface 41 is formed on a center part of each sliding surface 14a. The scraped surface is finished by a scraping process and a fitting process. Separating grooves 42 are formed between the scraped surface and oil-hold portions 15a, 15b. Since constructions other than the scraped surface 41 and the separating grooves 42 as replacements for the intermittent lubricant portion 19 are the same as in the first embodiment, explanations for them are omitted. Surface roughness is improved to finish the sliding surfaces by a scraping and a fitting process, so lubricant oil can be held in multiple imbrications formed on the scraped surfaces. Further, since undulations of the imbrications formed by the scraping are gentle, lubricant oil that flows out from the oil-hold portions 15a, 15b spreads widely on the whole of sliding surface 14a and becomes an oil film between the sliding surfaces 13a, 14a. Therefore, according to the second embodiment, the column 12 can be moved smoothly on the guide plate 13 by a lubricant function of the oil film even if the intermittent lubricant portion 19 of the first embodiment is not provided.

In the aforementioned embodiments, characteristics of the lubricant oil such as kinds or viscosity are not limited. For example, it is possible that the viscosity of the lubricant oil supplied to the oil-hold portion 15a and the viscosity of the lubricant oil supplied to the oil-hold portion 15b are made different. Further, although the bed 2 and the column 12 that moves on the bed 2 are described in the embodiments, the present invention can be applied between other members such as a bed and a table. Furthermore, although flat guiding surfaces 13a, 14a are described in the embodiments, other types of guiding surface such as a V-shape are applicable. In case of V-shape guiding surfaces, projected areas of the V-shape guiding surfaces are calculated as the areas of the oil-hold portions 15a, 15b. Moreover, the sliding materials 14 can be omitted. Further, the intermittent lubricant portion 19 of the first embodiment and the scraped surfaces 41 of the second embodiment can be omitted. On the other hand, it is possible that the lubricant oil is intermittently supplied to the scraped surfaces 41 as a combination of the first embodiment and the second embodiment.

Furthermore, the construction of the sliding surfaces is not limited. For example, it is possible that the guide plates 13 are omitted and the column 12 is directly guided on the bed 2 on which sliding surfaces are formed. Moreover, though only the case that the center of gravity is in the front portion of the column 12 is explained in the embodiments, the present invention can be applied to various other unbalanced states of a movable member. Further, various arrangements of the oil-hold portions 15b, 15, the intermittent lubricant portion 19 or the scraped surface 41 and the oil grooves 17a, 17b, 20 can be adapted. Each shape of the oil-hold portions 15a, 15b and the oil grooves 17a, 17b, 20 can be modified. Furthermore, not only stationary valves but also variable valves can be adopted as the throttle nozzles 16a, 16b, 32.

Obviously, numerous modifications and variations of the present invention are possible in light of the above teachings. It is thereby to be understood that within the scope of the appended claims, the present invention may be practiced otherwise than as specifically described herein.

What is claimed is:

1. A semi-contact guide apparatus comprising:
    a first member;
    a second member having a sliding surface and movably guided on the first member;
    a plural number of oil-hold portions formed on the sliding surface and subject to leakage of lubricant oil therein during movement of the second member on the first member, wherein dimensions of least two of the oil-hold portions are different and are defined according to a load distribution of the weight of the second member; and
    an oil-supply device constructed and connected to supply lubricant oil to the oil-hold portions, wherein said oil-supply device is configured such that a different amount of the lubricant oil is supplied to each of the oil-hold portion portions of different dimensions and is defined according to dimensions of the respective oil-hold portions.

2. A semi-contact guide apparatus according to claim 1, wherein:
the oil-supply device comprises a nozzle connecting to each of oil-hold portions; and
an opening of each of the nozzles is defined according to dimensions of the respective oil-hold portions.

3. A semi-contact guide apparatus according to claim 2, wherein a ratio between dimensions of each respective oil-hold portion and the opening of the nozzle connected thereto is approximately constant.

4. A semi-contact guide apparatus according to claim 1, wherein:
the oil-bold portions are disposed on opposite ends of the sliding surface along a moving direction of the second member; and
an intermittent oil-supply device is connected to the sliding surface between two oil-bold portions.

5. A semi-contact guide apparatus according to claim 1, wherein:
the oil-hold portions are disposed on opposite ends of the sliding surface along a moving direction of the second member; and
a part of the sliding surface between two oil-hold portions is finished by scraping.

6. A semi-contact guide apparatus according to claim 1, wherein each of the oil-hold portions comprises a quadrangular land portion and an oil groove disposed around the land portion.

7. A semi-contact guide apparatus according to claim 1, wherein said dimensions of the oil-hold portions are one of areas and volumes of the oil-hold portion.

8. A semi-contact guide apparatus according to claim 7, wherein a product of the area of the oil-hold portions and a pressure of the lubricant oil supplied to the oil-hold portions is approximately equal with the weight of the second member.

9. A semi-contact guide apparatus comprising:
a first member;
a second member having a sliding surface and movably guided on the first member;
a plural number of oil-hold means formed on the sliding surface and subject to leakage of lubricant oil therein during movement of the second member on the first member, wherein dimensions of at least two of the oil-hold means are different and are defined according to a load distribution of the weight of the second member; and
oil-supply means for supplying lubricant oil to the oil-hold means, wherein a different amount of the lubricant oil is supplied to each of the oil-hold means of different dimensions and is defined according to dimensions of the respective oil holding means.

10. A machine tool using a semi-contact guide apparatus comprising:
a bed having a table on which a workpiece is attached;
a column having a tool and a sliding surface, and movably guided on the bed;
a drive device connected for moving the column on the bed;
a plural number of oil-hold portions formed on the sliding surface and subject to leakage of lubricant oil therein during movement of the column on the bed, wherein dimensions of at least two of the oil-hold portions are different and are defined according to a load distribution of the weight of the column; and
an oil-supply device constructed and connected to supply lubricant oil to the oil-hold portions, wherein said oil-supply device is configured such that a different amount of the lubricant oil is supplied to each of the oil-hold portions of different dimensions and is defined according to dimensions of the respective oil-hold portions.

* * * * *